United States Patent [19]

Ling et al.

[11] 3,940,551

[45] Feb. 24, 1976

[54] APPARATUS AND METHOD FOR THE MELT REDUCTION OF IRON OXIDES

[75] Inventors: Bernt Ling; Björn Widell, both of Vasteras, Sweden

[73] Assignee: Allmanna Svenska Elektriska Aktiebolaget, Vasteras, Sweden

[22] Filed: Mar. 28, 1974

[21] Appl. No.: 455,949

[30] Foreign Application Priority Data
Mar. 30, 1973 Sweden .................. 7304515

[52] U.S. Cl. .................. 13/9 R; 13/18; 75/11; 13/33
[51] Int. Cl.² .................. H05B 7/20
[58] Field of Search .................. 13/18, 33, 12, 13, 9; 75/11

[56] References Cited
UNITED STATES PATENTS

| | | | |
|---|---|---|---|
| 3,004,137 | 10/1961 | Karlovitz | 13/9 P UX |
| 3,101,385 | 8/1963 | Robinson | 13/33 |
| 3,105,864 | 10/1963 | Robinson | 13/18 X |
| 3,432,606 | 3/1969 | Kociscin | 13/33 |
| 3,723,630 | 3/1973 | Paton et al. | 13/18 X |
| 3,789,127 | 1/1974 | Bowman | 13/12 |

*Primary Examiner*—R. N. Envall, Jr.
*Attorney, Agent, or Firm*—Kenyon & Kenyon Reilly Carr & Chapin

[57] ABSTRACT

A tubular electrode contains a feeding tube forming an annular passage between its outside and the inside of the electrode. With the electrode forming a cathode, an arc is formed between it and a carbonaceous iron bath in an enclosed hearth having a gas outlet. Iron oxide material in flowable form is fed through the inner tube to the arc while a non-oxidizing gas is fed via the passage formed between the two tubes, to the arc. The carbonaceous iron bath is made the anode and the action of the current forms an upward bulge in the metal in the arc, gravitationally freeing the bath from any slag at the arc. In this way the iron oxide material is melt reduced, the iron component being continuously added to the bath which may be continuously tapped to provide a supply of crude iron.

7 Claims, 2 Drawing Figures

U.S. Patent  Feb. 24, 1976  3,940,551
Fig. 1
Fig. 2
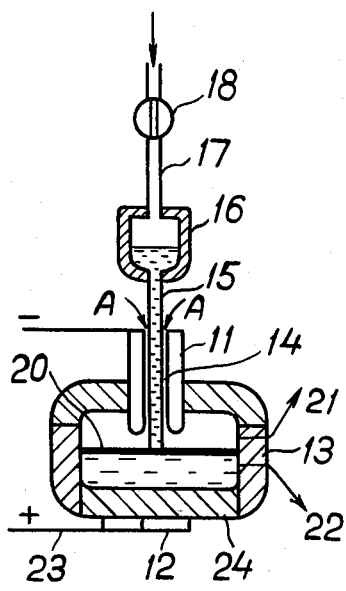
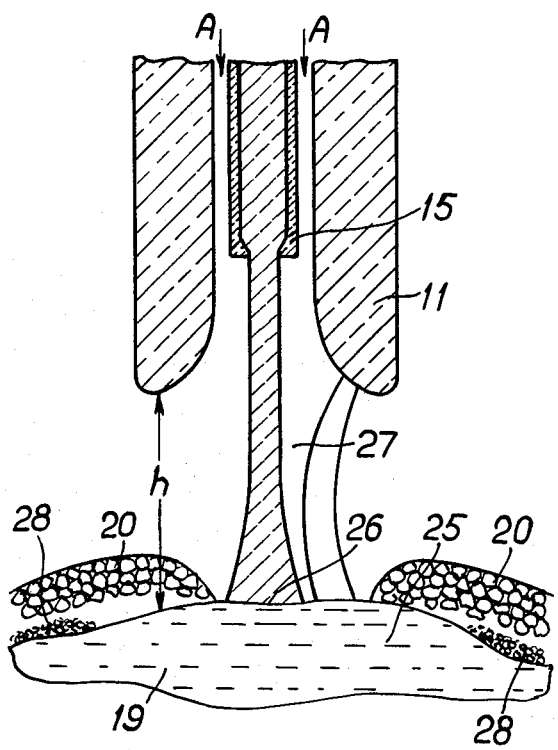

APPARATUS AND METHOD FOR THE MELT REDUCTION OF IRON OXIDES

BACKGROUND OF THE INVENTION

In the melt reduction of iron oxides, which may include other components as in the case of iron ore, the iron oxide material in powder or granular form is continuously fed to a molten carbonaceous iron bath where the carbon reacts with the oxygen to form the crude iron bath which is tapped continuously or as required from the hearth containing the bath.

When practicing this technique, it is often the second stage of a two-stage reduction of the iron oxides, the first stage comprising a prereduction effected by heating the iron oxide material while in a reducing gas, this first stage only partially reducing the iron oxide content of the material involved. In the case of iron ore, the gangue, of course, results in a slag floating on the molten bath, and the latter may also support a layer of carbonaceous material such as coke particles. Such layers floating on the bath prevent direct contact with the latter by the iron oxide material, preventing a rapid reduction of the iron oxide.

The above slow-reaction disadvantage can be corrected if the bath is heated to keep it molten via properly designed induction heating arrangements, but induction heating is relatively expensive as compared to arc heating.

It is desirable to feed both the iron oxide material and the carbonaceous material, and possibly flux, to the bath in the form of streams of powder having a relatively fine particle size. Particularly when arc heating is used, this practice involves the disadvantage that the powder material is blown about above the carbonaceous bath, making difficult its feeding to any desired location.

Also, for the melt reduction technique the hearth containing the carbonaceous bath is ordinarily enclosed so that the gas resulting from the reaction of the iron oxide with the carbon can be carried away via an exhaust arrangement. Therefore, if the powdered material is floating around within the enclosed hearth, an undesirably large amount may be drawn off by the exhaust instead of contacting the bath.

SUMMARY OF THE INVENTION

The object of the present invention is to eliminate the above disadvantages, or at least, substantially reduce the problems they cause.

In the melt reduction practice using arc heating, the electrode is normally made the cathode and the carbonaceous bath is made the anode, the bath being contained by a suitable conductive hearth. The current is, of course, a direct current and has adequate power and a suitable voltage for forming the arc.

According to the present invention, a tubular electrode is used, the arc between it and the molten carbonaceous bath causing a meniscus to be formed where the arc is drawn via the bath. This meniscus is an upward bulge formed in the iron bath which rises high enough so the carbonaceous material floating on the bath, and slag if it is present, gravitationally flow from the crown of the meniscus leaving this crown exposed as naked metal.

The tubular electrode contains a refractory tube having a smaller outside diameter than the inside diameter of the tubular electrode, thus forming an annular passage exending through the electrode together with the passage formed by the inside of the refractory tube. The iron oxide particles, which may be in the form of partially or prereduced iron ore, is fed via the refractory pipe to the arc, while at the same time a non-oxidizing gas is fed through the annular passageway so as to circumferentially surround the falling stream of iron oxide material. Thus, the latter is confined by the annular gas stream until it contacts the naked metal at the crown of the meniscus. This annular flow of gas is ejected under pressure and confines the powdered particles to prevent them from adhering to the arcing tip of the tubular electrode. Also, in the case of very fine grain powdered materials, the magnetic and electric forces of the arc have the effect of further confining the flow of powdered particles. The combined effects of the annular gas stream and of these magnetic and electric forces are such that practically all, if not all, of the powdered particles of the iron oxide material, impinge on the naked iron bath exposed by the meniscus.

BRIEF DESCRIPTION OF THE DRAWINGS

The presently preferred mode of carrying out the invention is schematically illustrated by the accompanying drawings, in which:

FIG. 1 is a vertical section showing the enclosed hearth, the electrode assembly, and the feeding of the particulated iron oxide material; and FIG. 2 is a vertical section on a greatly enlarged scale relative to FIG. 1 and showing the action involved.

DETAILED DESCRIPTION OF THE INVENTION

In FIG. 1 the tubular electrode 11 is shown operating as a cathode and powered by direct current, the anode connection to the bath being shown at 12. The electrode 11 may be made of any of the usual graphite materials. The fully enclosed hearth is shown at 13 and here again, the construction may be in accord with electric furnace practice in general.

The annular passage is shown at 14 as being fed with non-oxidizing gas at A—A, this annular passage being formed by the refractory feeding tube 15 for the powdered iron oxide material, such as the partially reduced ore, assuming the two-stage reduction practice is used. This tube 15, as shown by FIG. 2, terminates a short distance above the bottom or arcing end of the electrode 11, to prevent the tube 15 from being excessively heated by the arc. The tube 15 is, of course, electrically non-conductive, it preferably being made of ceramic material.

The gas fed at A—A may be argon, nitrogen, helium, carbon monoxide, hydrogen, etc. It should be a non-oxidizing gas relative to the iron oxide material. The tube 15 is fed via a batching vessel or chamber 16 via a supply tube 17 under the control of the valve 18 which permits adjustment of the flow rate. The batching vessel 16 is maintained only partially full so that a gas space exists above the material, this preventing pulsations or other irregularities in the supply of the powdered material to the bath in the hearth.

In FIG. 2 the molten crude iron bath is shown at 19 with the carbonaceous material 20 floating on the bath. This carbonaceous material may be coke having a particle size of between 3 and 8 mm supplied directly to the hearth 13 or through the tube 15 either in batches or mixed with the powdered iron oxide material.

The enclosed hearth or furnace contains an atmosphere of carbon monoxide and possibly hydrogen, and of the inert gas, and this is drawn off through the gas exhaust port 21, shown in FIG. 1, preferably in such a manner as to keep the atmosphere within the enclosed furnace slightly below atmospheric pressure, assuring that all of the gases can be drawn off via the exhaust port 21 and not elsewhere. The molten metal bath level may be maintained preferably by continuously withdrawing the crude iron from a tapping hole indicated at 22. It is to be understood that the anode connection 12, powered by the line 23, must carry current to the molten bath, this being done by making the bottom of the furnace, shown at 24, of electrically conductive material, such as graphite.

The arcing distance between the bottom end of the cathode electrode and the top level of the molten bath 19 should, of course, be kept relatively at a constant value. This may be done by controlling the rate by which the molten bath is tapped at 22.

FIG. 2, in particular, shows the action obtained by the practice of this invention. The meniscus which is formed by the action of the currents, is shown at 25, the carbonaceous material 20 being floated downhill to an extent exposing a crown 26 of naked metal. The flow of powdered iron oxide material is shown at 15a and it will be noted that here this flow impinges on the crown 26, the latter being indented somewhat, thus indicating the very effective contact obtained between the powdered material and the naked crown of the meniscus 25. The distance h indicates the arcing distance and as can be seen here, as is illustrated only on the right-hand side of FIG. 2, the arc 11a is drawn inward to form an annular converging space 27 containing the annular jet of the non-oxidizing gas under pressure.

In addition to including possibly the powdered carbonaceous material, such as the coke powder referred to, the powdered stream 15a may also contain powdered fluxing materials, but any slag layer, as indicated at 28, is gravitationally kept free from the active reaction zone at the crown 26.

As in all arc heating applications, the electrode 11 gradually burns away, requiring successive attachments of new electrodes to its upper ends as by the usual threaded arrangement. To make the connection, the tube 15 must be withdrawn, putting the desired continuous operation in a shut-down condition for the time required to make the connection and handle the various parts. However, completely continuous operations may be obtained by making the electrode 11 as a longitudinally split electrode (not shown), this avoiding the need for any handling of the tube 15 and its associated parts, while one section of electrode is used after another. The distance h should be kept at a constant value as is common in electric furnace practices. This may be done by continuously lowering the electrode 11 as required to maintain this distance, or the reduction operation may start out with a very shallow bath layer in the furnace 13, which level, by judicious tapping at 22, is permitted to rise as required to keep the distance h at the desired value.

In addition to the feeding advantages made obvious by the foregoing, such as keeping the powdered material confined to its stream form so that it does not blow about in the furnace, there is the additional advantage that the tubular electrode forms an arc of rather extensive cross-sectional area. The gas pressure of the gas introduced at A—A should be high enough to form a strong confining sheath in the area 27, holding the stream of powdered iron oxide material together until it impinges on the crown 26 of the meniscus 25, the desired force of this impingement being indicated in FIG. 2 by the fact that this crown is shown as slightly depressed by the force of the stream of powdered metal oxide. As previously indicated, this stream may include the powdered coke or other carbonaceous material.

Although the electrode has been described as being made of graphite, it may be formed with an electron emitting zone comprising, for example, thorium, barium or substances with similar properties, thus obtaining a spot or zone for electron emission.

In addition to a high deoxidation or reduction rate obtained by the formation of the arc on the naked metal of the crown 26 of the meniscus 25, the arc operates in a relatively quiet manner. Because of the annular gas jet and possibly a confining effect due to the annular arc, practically all of the powdered iron oxide material and any powdered carbonaceous material added with it, is confined directly to the bath where, as just indicated, the reaction rate is very rapid, this avoiding the problem of excessive dust floating around above the molten bath within the furnace enclosure.

As pointing out the production possibilities provided by the present invention, using a furnace power of 30 MW, and assuming that the two-stage reduction practice is followed so that the iron oxide material is partially prereduced, a feeding rate of the powdered metal oxide material can be in the area of 30 tons of powder per hour.

What is claimed is:

1. An apparatus for the melt reduction of iron oxide material and comprising a hearth having an electrically conductive lower portion, a tubular electrode extending downwardly towards said hearth and having a lower end, means conducting direct current to said conductive portion and to said electrode with the latter forming a cathode and causing the formation of a melt meniscus extending above the level of a melt in said hearth and positioned beneath the lower end of said electrode, and means for feeding iron oxide material in particle form through said electrode and its said lower end so as to fall on said meniscus.

2. The apparatus of claim 1 in which said feeding means comprises a refractory tube extending through said tubular electrode and forming therewith an annular passage extending through said electrode, and having means for feeding said material through said tube, and means for supplying said passage with gas under pressure.

3. The apparatus of claim 2 in which said tube has an upper end and said feeding means includes a batching vessel connected to said upper end for substantially uniformly feeding said iron oxide material thereto, and means including a flowcontrol valve for feeding said material to said vessel.

4. The apparatus of claim 3 in which said hearth has a cover and said electrode passes downwardly through said cover, said hearth having means for exhausting gases therefrom and means for continuously withdrawing molten metal therefrom, said feeding means including means for providing a continuous feed of said iron oxide material to said valve.

5. A method for the melt reduction of iron oxide material and comprising forming a direct current arc between an electrode and a carbonaceous iron melt with the electrode the cathode so as to cause the formation of a melt meniscus extending above the level of the iron melt, and feeding iron oxide material to said melt meniscus and directly within said arc.

6. The method of claim 5 in which said arc is annular and said material is fed as a stream inside of said arc.

7. The method of claim 6 in which said stream is enclosed by an annular jet of non-oxidizing gas.

* * * * *